W. LIPPINCOTT.
TREE AND PLANT GUARD AND PROTECTOR.
APPLICATION FILED JULY 18, 1908.

933,654. Patented Sept. 7, 1909.

Witnesses:
B. C. Lukens
A. W. Scherer

Inventor:
Walter Lippincott
By Allen B. Clement
Attorney

UNITED STATES PATENT OFFICE.

WALTER LIPPINCOTT, OF PHILADELPHIA, PENNSYLVANIA.

TREE AND PLANT GUARD AND PROTECTOR.

933,654.  Specification of Letters Patent.  Patented Sept. 7, 1909.

Application filed July 18, 1908. Serial No. 444,190.

*To all whom it may concern:*

Be it known that I, WALTER LIPPINCOTT, a citizen of the United States, residing at No. 2101 Walnut street, in the city and county of Philadelphia, State of Pennsylvania, have invented a new and useful Tree and Plant Guard and Protector, of which the following is a specification.

My invention relates to improvements in tree and plant guards and protectors.

The objects of my invention are: First.—To prevent injury to the trunks of trees or other objects from lawn mowers, sickles, scythes and other garden and farming implements and destruction by rabbits and other animals by a guard or collar that will not itself mar or injure the object which it is intended to shield and protect. Second.—To furnish a guard for the protection of young trees and other like objects, that readily and quickly can be applied, removed or operated, permitting easy access to the tree or protected object, for the purpose of cleansing and cultivating or of replacing the guard by another of larger dimensions to allow untrammeled growth. Third.—To supply in such a guard one that will present a neat and uniform appearance, be strong, rigid and durable, and not in any way in contact with, or supported by, the trunk of the tree or protected object and may be erected at any desired distance from the same.

Figure 1:
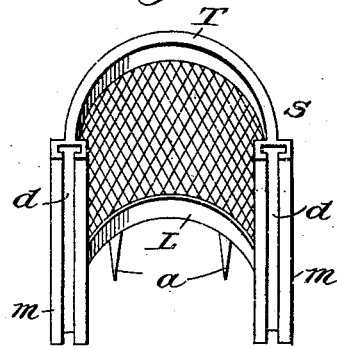
Figure 2:
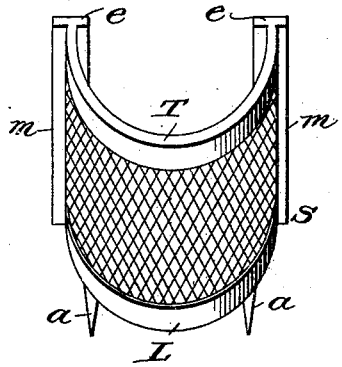
Figure 3:
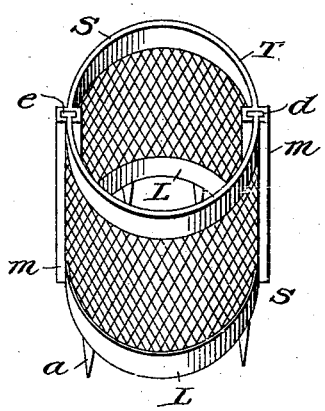
Figure 4:
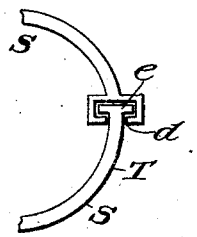

In the accompanying drawing showing a specific type of my invention, given for illustrative purposes and not to limit the same, Figure 1 is a view of one part of a guard consisting, in this case, of a pair of semi-circular sections. Fig. 2 is a counter-part of Fig. 1. Fig. 3 is a view of a pair of said parts assembled and forming a completed guard. Fig. 4 is an enlarged view of the coupling or inter-locking device of the respective sections.

My invention, illustrated in the accompanying drawing in which similar letters refer to similar parts throughout the several views, consists of two or more sections "S" which constitute the units of and taken together form a cylinder, as shown in Fig. 3. Each section consists of a substantial frame or heavy rigid portion surrounding and supporting a screen, meshed wire or other substance of any desired design and weight. The upper edge "T" and lower edge "L," as shown in drawing, are arcs of a circle, the lower edge "L" being supplied with any desired number of sharpened legs, prongs or spikes "a," which, when forced into the ground, hold the guard in a fixed position. The vertical edges "m" of the guard are straight as shown in Figs. 1, 2 and 3. To the said vertical edges "m" on one side is a double groove or T-slot as shown at "d" in Fig. 1, while the corresponding vertical edge "e" of the adjacent section is keyed or in the form of a T-head, shown in Fig. 2. The double groove "d" of each edge "m" slides down over the corresponding T-head "e" on the edge "m" of the adjacent section forming rigid and fixed cylinder as shown in Fig. 3.

In giving the foregoing views I do not mean to limit or confine myself to guards made of semi-cylinders, but the sections may be of any smaller segments of cylinders or prisms and may be plane, so that cross sections in place of circles may be triangles, squares or any other figures, and each section may be constructed with a T-head on one vertical edge and a T-slot on the other of its vertical edges so that, in this type of guard, each section would have a right and left side and they would all be of the same size and exactly alike.

I am aware that prior to my invention boxes have been built around trees, and numerous means have been employed to protect them. But I am not aware that any device speedily adjustable, durable in its construction, neat in its appearance and permanent in its position has been invented for the protection of the base of trees and like objects.

I, therefore, claim as my invention and desire to secure by Letters Patent—

1. A guard consisting of sections each comprising spaced upper and lower members and end members connecting the same, wire mesh secured to each section, the end members of one section being provided with T-slots and those of the other section with T-heads to detachably connect said sections.

2. A guard consisting of sections each comprising spaced upper and lower members and end members connecting the same, wire mesh secured to each section, the end members of one section being provided with T-slots and those of the adjacent section with T-heads to detachably connect said sections and having respective lower members provided with anchoring prongs.

3. A rigid, self-supported guard consisting of independent sections, each comprising spaced upper and lower members and end members connecting same, said members surrounding and sustaining meshed material, said end members of said sections adapted to abut, that on one side being provided with T-slots and that of the adjacent side of adjoining section with T-heads, to detachably connect said sections, and said lower members provided with spikes or prongs adapted to anchor said respective sections, substantially as described and for the purposes set forth.

WALTER LIPPINCOTT.

Witnesses:
M. L. TRASEL,
E. H. LIPPINCOTT.